Figure 5:
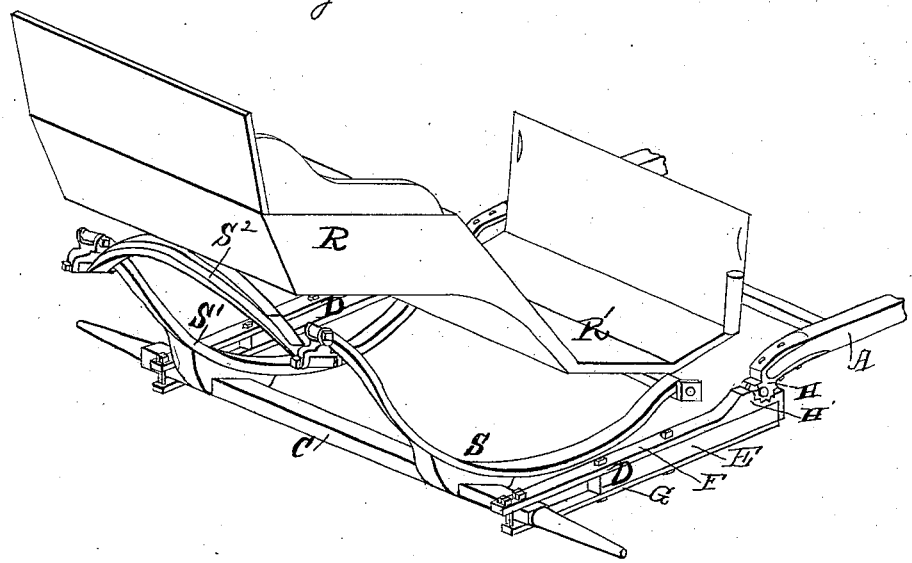

(No Model.)  2 Sheets—Sheet 1.
J. HOWELL.
TWO WHEELED VEHICLE.
No. 308,162.  Patented Nov. 18, 1884.
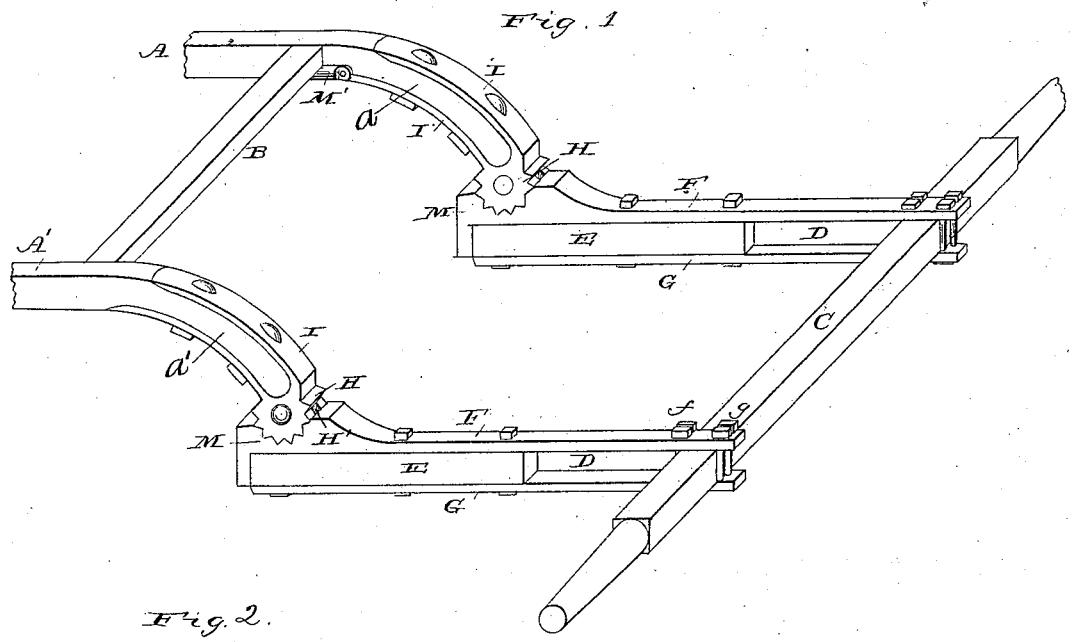
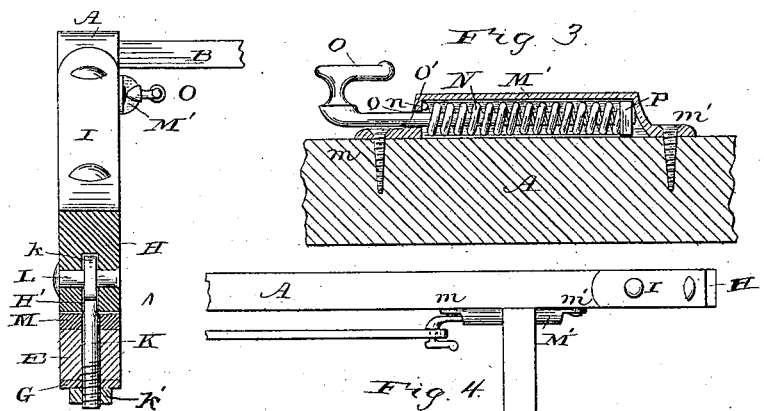
Witnesses:
H. N. Low
J. S. Barker
Inventor:
Jacob Howell
by Doubleday & Bliss
Attys.

(No Model.) 2 Sheets—Sheet 2.
J. HOWELL.
TWO WHEELED VEHICLE.

No. 308,162. Patented Nov. 18, 1884.

United States Patent Office.

JACOB HOWELL, OF JACKSON, MICHIGAN.

TWO-WHEELED VEHICLE.

SPECIFICATION forming part of Letters Patent No. 308,162, dated November 18, 1884.

Application filed July 12, 1882. Renewed April 17, 1883. (No model.)

*To all whom it may concern:*

Be it known that I, JACOB HOWELL, a citizen of the United States, residing at Jackson, Michigan, have invented certain new and useful Improvements in Two-Wheeled Vehicles, of which the following is a specification, reference being had therein to the accompanying drawings.

Figure 1 is a perspective view of a portion of a pair of shafts or thills having my improvements embodied, this view showing also a portion of that part of the vehicle to which the shafts or thills are attached. Fig. 2 is a vertical section through the central part of the devices which clamp the rear ends of the shafts in place. Fig. 3 is a cross-section of the spring-whiffletree. Fig. 4 is a plan view of the rear part of the thills or shafts. Fig. 5 is a perspective view showing the method of attaching a body to the draft device shown in Fig. 1.

The draft-frame is constructed with a cross-bar, B, to which are rigidly attached the thills, one of which is composed of the forwardly-projecting arm A and the rearwardly-projecting arm $a$, and the other is composed of corresponding arms, A' and $a'$.

C represents the axle, and D D are arms or bars extending more or less forwardly from the vehicle, they being for some purposes preferably secured to the axle in the manner shown, though they may be joined thereto in any of the ways used or known prior to my invention. These arms or bars can be made with a wooden part, E, an upper metal plate, F, and a lower plate, G.

$f$ and $g$ represent bolts or clips which may be used to secure the plates to the axle. Each shaft is directly connected to one of the forwardly-projecting arms or bars, D, independently of the other shaft, the connecting devices being such as to permit the outer ends of the shafts to be raised or lowered and clamped in any desired position.

The connecting devices shown are constructed as follows: The rearwardly-extending arm $a$ of the right-hand thill is at the rear end provided with a metal connecting-piece, H, which is adapted to carry a horizontal pivot, it being horizontally perforated for that purpose, and, further, is formed with ribs, corrugations, or cogs upon its outer surface. These latter are adapted to engage with corresponding ribs, corrugations, or cogs formed in a socket at the outer end of the arms D, said socket being preferably made with the upper metallic plate, F, which can be enlarged for this purpose.

K is a bolt passing vertically through the arm and engaging with the pivot-bolt L, carried by the rear end of the arm $a$ of the shaft, preferably by means of a perforated plate, $k$. To permit an adjustment of the shaft around the axis of the pivot-bolt, the part H of the coupling is provided with a slot, H', which allows sufficient oscillation of said part H.

When it is desired to vary the position of the shaft above described relatively to the vehicle, the nut $k'$ is loosened sufficiently to allow the shafts to be turned around the pivot-bolt L, after which the rear end of the shaft is again drawn down tightly and secured, the ribs or corrugations at the rear end of the shaft being clamped in engagement with those of the front end of the forwardly-extending bar or arm D. The rearwardly-extending arm $a'$ of the left-hand shaft is secured to the other forwardly-projecting arm or bar of the body in the same manner as that described above.

In Fig. 5 I have shown how the devices above described can be used in connection with a body of the character shown in another application of mine, filed May 26, 1882. In said figure, R represents the body or seat portion, R' the foot-rest, and S S' S$^2$ represent springs, these parts resting upon and being joined to the parts above described.

I am aware of the fact that two-wheeled vehicles have been heretofore made with shafts curved inwardly at their rear ends and joined together, and on the central line of the body secured to a swinging frame which extends across the front of the body and back by the sides thereof to the axle, in combination with forwardly-projecting arms pivoted to the supplemental frame, said frame having at its rear ends devices for clamping it in different positions after it has been moved about the axis of the pivots; and I do not claim such device as my invention. I however dispense entirely with any supplemental frame, and am not put to the expense either of that or of the inwardly-bent shafts. The shafts in my case have the rear ends of the arms $a$ and $a'$, which project backwardly from the cross-bar, directly secured to the front ends of the arms projecting forwardly from the body or seat support, and the clamping devices are in immediate proximity to the pivots. Moreover, I avoid not only the expense incident to the construction above mentioned, but provide a much neater and less cumbrous vehicle than is produced when use is made of the frames encircling the front of the body and having comparatively long arms projecting rearwardly behind the pivots.

In another respect my construction differs from any heretofore used, in that the clamping-bolt passes directly through the bars E, and therefore I can not only effect the clamping at any desired point with a single bolt, but can arrange the bolt very near to the axial line about which the shafts are adjusted and give a strong support for the clamping devices. Heretofore, when the thills have been pivoted to arms projecting forwardly from the body, the clamping has been effected by extending arms back along the sides of the body, and by combining therewith comparatively long yokes with screws, one above and one below each side bar. This has been a very inferior construction, and has made the vehicle still less neat in appearance and more cumbrous than even it was by the supplemental frame above alluded to. Of course it will be understood that in several respects the positions of the parts could be reversed without departing from the invention.

The invention relates, also, to an improvement in the casings or holders used for retaining the springs and tug-hooks which are sometimes combined with vehicles in place of a whiffletree.

M represents a casing adapted to be attached to the inner side of a thill. It is formed with a tight outer wall parti-cylindrical in form—that is to say, it has a flat rear side which is open, and is adapted to be fitted tightly to the thill. It is cast with ears $m\ m'$, integral with the rest of the casing, and which permit it to be rigidly screwed in place against the flat part of the thill. At one end it has an aperture, and through this passes a rod, O', having a hook, O, at the end, said rod being arranged centrally within a coiled spring, N, and passing longitudinally through it to the rear end, where it is provided with a nut, P, which bears against the rear end of the coiled spring. The tug is secured to the hook O, and when a forward draft is exerted by means of the tug the spring is compressed, and vice versa. This is also the result when there is a backward strain relatively to the tug. In this way the jolting and jerking incident to the draft devices are overcome.

I do not claim, broadly, the use of a coiled spring at this point, or the combination with such a coiled spring of a casing, broadly considered, as I am aware that such devices are old; but I have found that my means, considered as a whole, when constructed and related in the manner shown, have advantages not incident to any other similar device, and avoid difficulties which have been met with in using others.

By having the spring and rod entirely inclosed, except where the small aperture is at the front end, and by passing the hook-rod longitudinally through the spring, I not only obtain a better draft upon the spring and prevent the eccentric or outwardly-straining pull experienced in using springs having the hooks projecting through the side of the casing, but I also protect the parts within the casing entirely from interference from dirt and foreign substances.

By having the casing parti-cylindrical in form I can leave it flat upon the rear side, and therefore fit it tightly against the flat side of a thill, and leave it open for the insertion of a spring. Use has been heretofore made of a spring-casing made of three parts—a barrel and two separable heads—the barrel having straps adapted to encircle the curved part of a shaft and to be clamped by a thumb-screw. These devices, however, cannot be applied to a thill of any make or style, as mine can, but must be more or less specially adapted to the vehicles to which they are to be applied. The heads must be removable, as they have been heretofore constructed, inasmuch as use has been made of two rods and hooks, and these can be inserted only after removing the heads.

In my case, to put the parts together it is only necessary to insert the spring N through the back of the casing, then insert the rod O' through the aperture $o$, (the nut P being removed,) then put the nut in place and turn the rod a sufficient number of times to engage them together, and then insert the screws at $m\ m'$.

I am further aware of the fact that prior to my invention use had been made of two-wheeled cabs, each having upwardly-projecting plates or bars at the front edge of the cab, with the shafts hinged at the upper ends or edges thereof, and having an extensible brace secured to the shafts at points considerably ahead of the hinges (at the rear ends) and secured to the cab-frame at points considerably below said hinges.

In my construction, as heretofore said, I secure the clamping devices at points in direct proximity to the axial line about which the shafts are adjusted, and this relative arrangement of parts is one of great advantage in the manufacture of light two-wheeled carriages, as I can give them a tasty appearance and avoid the cumbersome one produced when use is made of long inclined braces, which, in fact, must necessarily be comparatively long in order to attain the ends for which they are employed. Especially is there need for a fastening of the character of mine (that is to say, one having the clamping parts situated in direct proximity to the axial line about which the shafts are adjusted) when the upwardly-projecting arms to which the shafts are pivoted extend forward on or near the lowermost horizontal line of the vehicle-body, there being in such case nothing projecting downward adapted to receive a brace.

I do not claim a thill-coupling having one part provided with a concave socket and the other with a convex hinge-piece to fit said socket, and bolts for the purpose of holding said hinge portion and the socketed portion together. With these thill-couplings, however, it has not been intended to clamp the parts rigidly together, and, in fact, no positive clamping is provided by the parts last above referred to, whereas in my construction there is a positive clamping effected directly at the axial line on which the shafts are adjusted.

What I claim is—

1. In a two-wheeled vehicle, the combination of a body or running-gear having arms projecting forwardly therefrom, the shafts or thills having their rear ends independently of each other and directly connected to the forward ends, respectively, of the said forwardly-projecting arms, and clamps secured to the front ends of the forwardly-projecting bars in immediate proximity to the axial line of the shaft, for locking or clamping the shafts in different vertical positions relatively to the said forwardly-projecting bars, substantially as set forth.

2. The combination, with the body or running-gear having arms which project forwardly therefrom, of the shafts or thills, each secured at its rear end directly to one of the said forwardly-projecting arms, one of said parts (the rear end of the shaft or the front end of the forwardly-projecting arm) being provided with a curved socket, and the other with a curved or convex surface fitted to said socket, and positively-acting clamping devices secured directly to the ends of the parts at the joint, and which prevent the said parts from oscillating relatively to each other after they have been adjusted and clamped, substantially as set forth.

3. The combination, with the thills and that portion of the vehicle which is behind the thills, of the cogged, ribbed, or corrugated socket connected with the one, and the convex cogged, ribbed, or corrugated coupling-piece connected with the other, the cogs or ribs of one piece being arranged to engage with the other in various positions vertically, substantially as and for the purposes set forth.

4. The combination of the central vertical clamping-bolt, K, the pivot-pin L, the coupling-piece H, having ribs or corrugations, and a central slot, H', and the socket-piece having ribs or corrugations which engage with those on the part H, to prevent vertical oscillation of the thills after they have been clamped by means of said bolt.

5. The combination, with the thills and that portion of the vehicle which is behind the thills, of the concave socket attached to one and the convex coupling-piece attached to the other and adapted to fit the concave socket, a pivot-rod connecting each thill with the vehicle independently of the other, and a clamp which secures the thill after adjustment, the clamp having an aperture through which passes the pivot, substantially as set forth.

6. The combination of the thills, the body or running-gear having bars to which the thills are attached, substantially as set forth, to have their outer ends adjustable vertically, clamping-bolts carried by and passing directly through the said bars, and slotted connecting-pieces carried, respectively, by the adjustable parts of the thill, and having the aforesaid clamping-bolts passing through the slots to allow the adjustable parts of the thills to swing relatively to the bolts, substantially as set forth.

7. The combination of the spring-casing M', constructed with a tight parti-cylindrical wall and with an open rear side, an aperture, o, in the front end, and perforated ears $m\ m'$, cast integrally with the walls, the coiled spring N, adapted to be inserted into the casing through the open rear side, and the hook-rod O', passing longitudinally through the coiled spring and engaging with the rear end thereof, substantially as set forth.

In testimony whereof I affix my signature, in presence of two witnesses, this 1st day of July, 1882.

JACOB HOWELL.

Witnesses:
V. V. B. MERWIN,
W. H. VAN HORN.